(12) United States Patent
Child et al.

(10) Patent No.: US 10,257,182 B2
(45) Date of Patent: Apr. 9, 2019

(54) LOGIN PROXY FOR THIRD-PARTY APPLICATIONS

(71) Applicant: Okta, Inc., San Francisco, CA (US)

(72) Inventors: Reman Child, Emeryville, CA (US); William Dawson, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 76 days.

(21) Appl. No.: 15/219,228

(22) Filed: Jul. 25, 2016

(65) Prior Publication Data

US 2018/0026964 A1    Jan. 25, 2018

(51) Int. Cl.
*H04L 29/06* (2006.01)

(52) U.S. Cl.
CPC ........ *H04L 63/0815* (2013.01); *H04L 63/062* (2013.01)

(58) Field of Classification Search
CPC .................................................. H40L 63/0815
See application file for complete search history.

(56) References Cited

U.S. PATENT DOCUMENTS

| | | |
|---|---|---|
| 6,865,680 B1 | 3/2005 | Wu et al. |
| 2010/0325440 A1 | 12/2010 | Deutschmann et al. |
| 2011/0277027 A1 | 11/2011 | Hayton et al. |
| 2014/0189808 A1 | 7/2014 | Mahaffey et al. |
| 2014/0344907 A1 | 11/2014 | Wan et al. |

OTHER PUBLICATIONS

Stackoverflow, "headless internet browser? [closed]" Stack Exchange Inc, 2009, 5 pages, [retrieved on Oct. 31, 2016] Retrieved from the internet <URL:http://stackoverflow.com/questions/814757/headless-internet-browser>.
PCT International Search Report and Written Opinion for PCT/US2017/035978, dated Sep. 12, 2017, 11 pages.

*Primary Examiner* — Simon P Kanaan
(74) *Attorney, Agent, or Firm* — Fenwick & West LLP (57) ABSTRACT

Users of organizations use many different third-party applications. The organizations use the services of a server to manage and interact with the third-party applications. In particular, the server provides a remote login service that interacts with auto-login components executing within the domains of the organizations. The auto-login components intercept (e.g., at networking devices of the organization) the requests to login to, or otherwise use, the third-party applications, and sends them to the remote login service. The remote login service handles transparent login of the users to the third-party applications, capturing resulting URLs and session cookies of the third-party applications and providing them to the user browsers so that the user is automatically provided with access to the applications without requiring manual login interactions.

16 Claims, 3 Drawing Sheets

LOGIN PROXY FOR THIRD-PARTY APPLICATIONS

FIELD OF ART

The present invention generally relates to the field of software applications, and more specifically, to facilitating user login to third-party software applications.

BACKGROUND

Many organizations, such as businesses or other enterprises, provide their users (e.g., employees) with access to a variety of software applications, such as e-mail applications, chat applications, payroll applications, timekeeping applications, and the like.

As the number of software applications increases, it becomes increasingly difficult for users to manage the different applications. For example, remembering the usernames and passwords, or other credentials, used to log in to the various applications becomes particularly burdensome in the case of many applications.

Technologies could be automated to assist the users in managing the different applications to which the users have access, some with greater degrees of transparency than others. For example, technologies relying on installation of software on individual client devices of users typically require skilled staff (e.g., system administrators) to handle the installation and maintenance of the software, which becomes increasingly difficult for larger organizations. Additionally, in the case of automating login to the applications, technologies operating primarily on the client-side risk exposing client secrets, such as passwords or other credentials, to users, thereby introducing security vulnerabilities.

SUMMARY

Users of organizations use many different third-party applications. The organizations use the services of a server to manage and interact with the third-party applications. In particular, the server provides a remote login service that interacts with auto-login components executing within the domains of the organizations. The auto-login components intercept (e.g., at networking devices of the organization) the requests to login to, or otherwise use, the third-party applications, and sends the requests to the remote login service. The remote login service handles transparent login of the users to the third-party applications, capturing resulting URLs and session cookies of the third-party applications and providing them to the user browsers so that the user is automatically provided with access to the applications without requiring manual login interactions. The handling of login requests by the remote login service of the server additionally prevents client-side devices from having to store and/or provide client credentials or other secrets, which reduces the potential for security vulnerabilities, e.g., due to malware executing within the client domain, or due to the users themselves obtaining and misusing their credentials.

In one embodiment, a computer-implemented method performed by an organization comprises: requesting, by a user of the organization, to access a remote third-party application; intercepting, by an auto-login component of the organization, the request; delegating, by the auto-login component, the request to a remote login service; receiving, from the remote login service by a browser of the user, a redirect request to the remote login service, the redirect request including an identifier of the remote third-party application; redirecting, by the browser of the user, to the remote login service; receiving, from the remote login service, a uniform resource locator (URL) of a start page of the remote third-party application and a session cookie indicating that the user is logged into the remote third-party application; and automatically requesting, by the browser of the user, the start page of the remote third-party application, the request for the start page including the session cookie.

In one embodiment, a computer-implemented method performed by a login service comprises: receiving, from an auto-login component of a remote organization, a request to log a user of the remote organization in to a remote third-party application; communicating with the remote third-party application via a headless browser to log the user in to the remote third-party application; receiving, from the remote third-party application, a uniform resource locator (URL) of a start page of the remote third-party application and a session cookie indicating that the user is logged into the remote third-party application; and providing, to a browser of the user, the session cookie and a redirect to the URL of the start page.

In one embodiment, a non-transitory computer-readable storage medium stores instructions executable by a computer processor and comprising: instructions for requesting, by a user of an organization, to access a remote third-party application; instructions for intercepting, by an auto-login component of the organization, the request; instructions for delegating, by the auto-login component, the request to a remote login service; instructions for receiving, from the remote login service by a browser of the user, a redirect request to the remote login service, the redirect request including an identifier of the remote third-party application; instructions for redirecting, by the browser of the user, to the remote login service; instructions for receiving, from the remote login service, a uniform resource locator (URL) of a start page of the remote third-party application and a session cookie indicating that the user is logged into the remote third-party application; and instructions for automatically requesting, by the browser of the user, the start page of the remote third-party application, the request for the start page including the session cookie.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
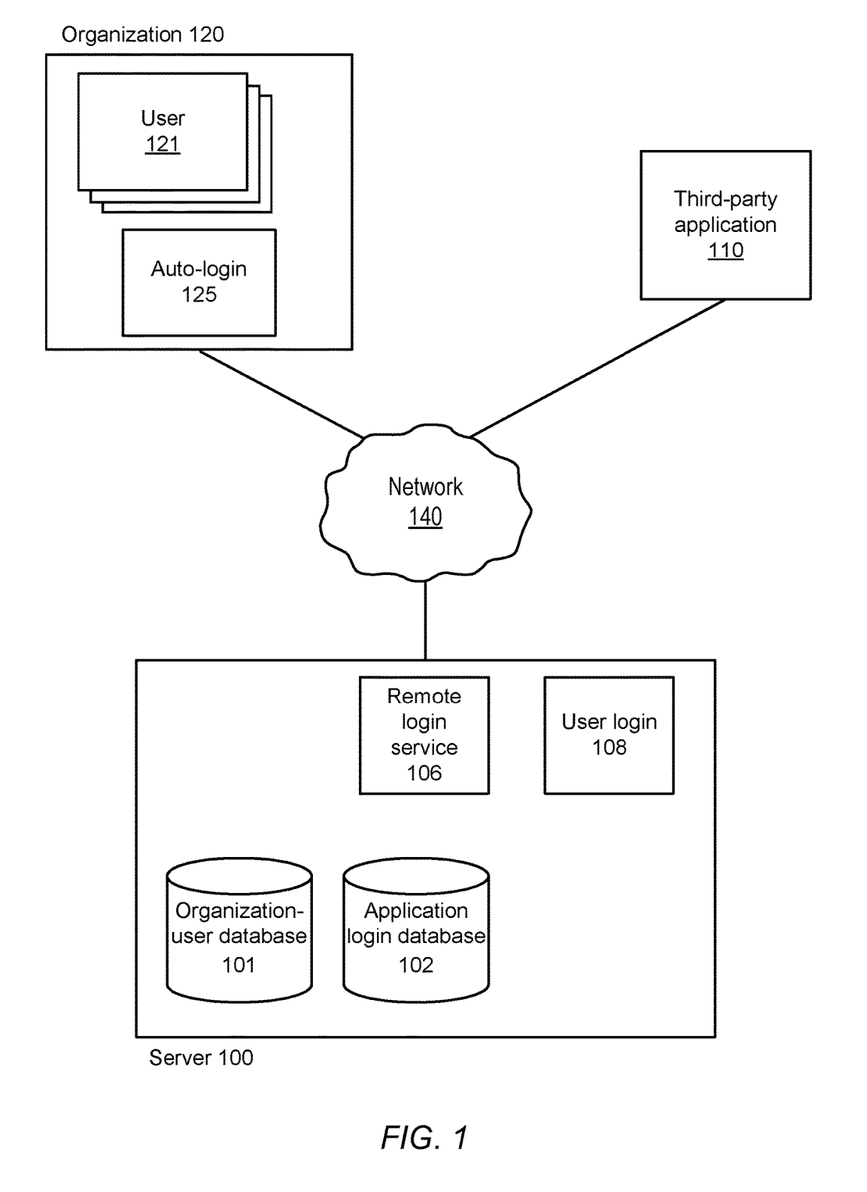
FIG. 1 illustrates one embodiment of a computing environment in which users of an organization use third-party applications available to that organization, and in which a server provides services that support the organization in interacting with and managing the applications, according to one embodiment.

FIG. 1 illustrates one embodiment of a computing environment in which users of an organization use third-party applications available to that organization, and in which a server provides services that support the organization in interacting with and managing the applications, according to one embodiment.

An organization 120 (e.g., a corporation or other business) has a number of different users 121 (e.g., employees), such as administrators having enhanced privileges, or non-administrator employees with lesser privileges. Each user 121 can use various client devices (e.g., desktops, laptops, tablet computers, smart phones, or the like) to access resources of the organization 120. In particular, the client devices provide access to a number of third-party applications 110, which for reasons of organizational security require user authentication before a user can use the applications. A server 100, which may be administered by an organization other than the organization 120, provides support to the organization 120 when interacting with and managing the third-party applications 110. For example, the server 100 may provide services such as single sign-on, in which a user of the organization signs in to the server 100, and the server 100 handles authentication of the user on all of the third-party applications 110 to which the user has access.

The organization 120 is an entity, such as a corporation, a school, a governmental department, or the like. Physically, the organization 120 is made up of a number of computing systems, including the client devices of the users 121; one or more internal networks that connects the computing systems, including routers or other networking devices that define the boundary between the organization and external networks; and the like.

Similarly, the server 100, although depicted as a single logical system in FIG. 1, may be implemented using a number of distinct physical systems and the connections between them, such as application servers, database servers, load-balancing servers, routers, and the like.

The third-party applications 110 may be created by different application developers. The third-party applications 110 available to a particular organization 120 could include, for example, SALESFORCE, MICROSOFT OFFICE 365, GOOGLE APPS, CISCO WEBEX, AMAZON WEB SERVICES, and the like. The third-party applications 110 are typically hosted entirely or partially on a server(s) located at a remote location from the organization 120 and made available via a network 140, such as the Internet. In one embodiment, the third-party application's user interface is implemented in HTML or other web-based technology and is rendered within embedded browsers of the client devices of the users, or within a custom application installed on the client devices. Although the term "third-party application" is used herein since for the typical organization 120 the majority of applications that a user uses are authored by different organizations, it is appreciated that the "third-party applications" could also include applications created and/or hosted by the organization 120 itself, or by the server 100.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

In one embodiment, the server 100 has a user login module 108 that it uses to enable a user 121 to log in to the server 100 (e.g., using username/password or other form of credentials, which may require multi-factor authentication), thereby establishing the identity of the user and (based on the identity of the user) the organization to which the user belongs.

The server 100 has an organization-user database 101 that describes properties of the different organizations 120 to which the server 100 provides support, as well as properties of the users of those organizations. For example, in one embodiment, the database 101 stores at least, for each organization 120, a unique identifier of the organization, a list of unique user identifiers for the users 121 of the organization, and unique identifiers of various third-party applications 110 to which the organization—or sub-groups within the organization—provides access. Similarly, the database 101 stores at least, for each user 121 of the organization 120, one or more indicators of the third-party applications 110 to which that user has access. The indicators may be direct indicators of the third-party applications 110 (e.g., a unique identifier), and/or indirect indicators, such as identifiers of organization groups to which the user belongs, where the database 101 further stores identifiers of the third-party applications to which the organization groups have access.

The server 100 also has an application login database 102 that specifies, for each supported third-party application 110, the manner in which the application expects login to proceed. For example, in one embodiment the application login database 102 specifies, for each supported third-party application 110, a URL at which the application expects login, and identifiers of the field(s) in which the user's login credentials are to be supplied. (For example, for a hypothetical application MyApp, the application login database 102 might specify that the login page is at the URL myapp.com/login/, and that the user credentials are specified in a username field named user_name and in a password field named user_password.) The application login database 102 enables the server 100 to follow the format expected by each third-party application 110 when logging in a given user 121 to each of the user's third-party applications.

The organization 120 further includes an auto-login component 125 that facilitates user login to third party applications 110, and the server 100 further includes a remote login service 106 that communicates with the auto-login component 125 in order to facilitate the user login.

The auto-login component 125 obtains indications of accesses by users 121 to third-party applications 110 and communicates with the remote login service 106 on the server 100 to transparently provide the users with access to the applications, even when the users are not already logged into the applications.

The auto-login component 125 may be implemented in different manners in different embodiments. In some embodiments, the auto-login component 125 is implemented as rules executed by one or more routers or other networking devices of the organization 120. In this embodiment, the auto-login component 125 operates at the application layer of the networking stack, matching a specified set of URLs for login pages of third-party applications 110 that are available to users of the organization 120, and instead of making an HTTP request for those URLs, making an HTTP request for substitute URLs that specify the remote login service 106. For example, in one such embodiment, a URL for the requested login page of the third-party application 110 is replaced with a substitute URL including a domain name of the remote login service 106, with the domain name and path of the requested login page URL being included as a parameter of the substituted URL. For instance, for the original requested URL http://myapp.com/login, the substituted URL might be http://login.server.com/login?app=myapp.com/login, where the parameter 'app' is set to the domain name and path of the original requested URL. It is appreciated that the original requested URL could be mapped to the substitute URL in different manners in other embodiments.

In other embodiments, the auto-login component 125 is implemented as a non-executable data file that is installed on the various client devices of the users 121, causing the application layer of the networking software of the individual client devices to replace the original requested URLs with substitute URLs, in a manner similar to that described above.

In one embodiment, the auto-login component 125 is authored by the same company or other organization that is responsible for the server 100 and is made available to the organization 120 for use within its internal network. In some embodiments, the substitution rules of the auto-login component 125 that replace the original requested URLs with substituted URL are specified entirely by the organization that is responsible for the server 100; in other embodiments, each organization 120 may modify the rules, e.g., to avoid supporting login for third-party applications 110 that the organization 120 does not make available to its users.

Figure 2:
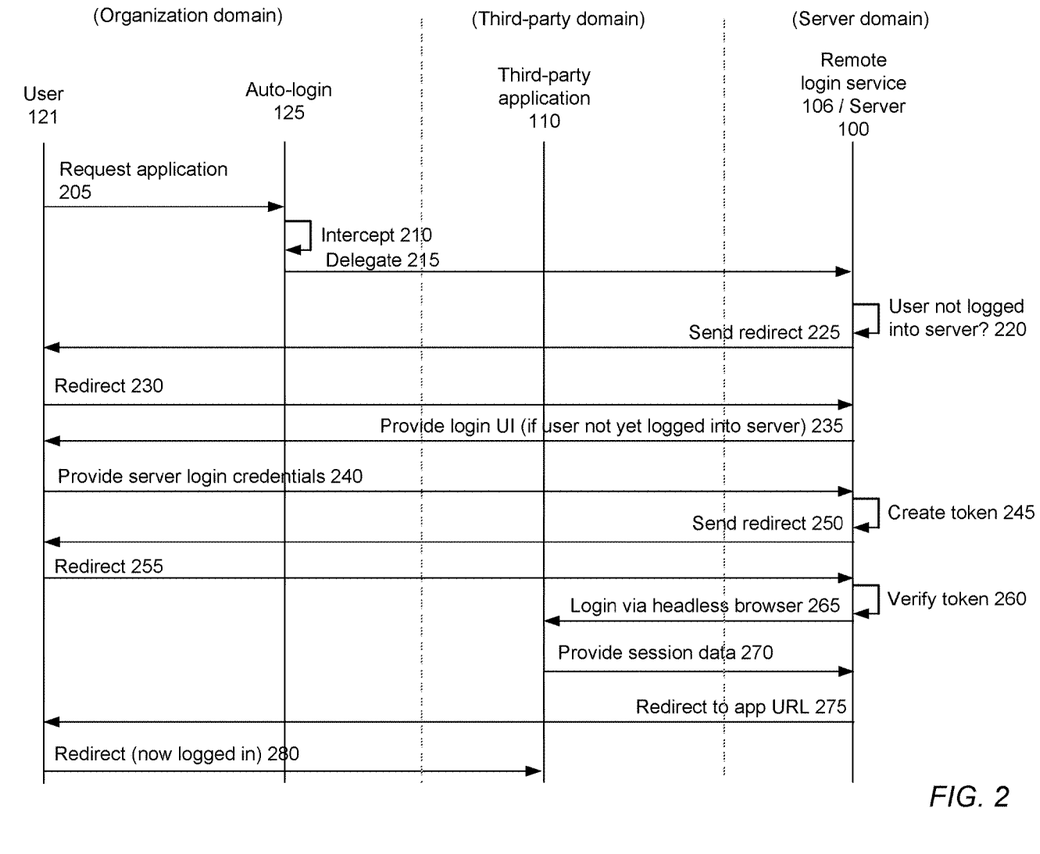
FIG. 2 illustrates the interactions that take place between different entities of FIGS. 1 and 2 when a user requests login to a third-party application, according to one embodiment.

FIG. 2 illustrates interactions that take place between different entities of FIG. 1 when a user 121 requests login to a third-party application 110, according to one embodiment. The example of FIG. 2 assumes that the user 121 does not currently have a session with the server 100 or the third-party application 110.

In step 205, a user 121 uses his or her client device to request 205 use of a particular third-party application 110. For example, the user might manually type a uniform resource locator (URL) (e.g., myapp.com, for a hypothetical third-party application made available at the domain myapp.com) for the third-party application into the user's browser, or use a link, a bookmark, or other shortcut corresponding to that URL.

The auto-login component 125 intercepts 210 the request for the third-party application 110 and delegates 215 to the remote login service 106 to handle details of the login on the server 100 by substituting the original requested URL of the third-party application 110 with a substituted URL for the remote login service. As noted above, in some embodiments the auto-login component 125 is implemented within the domain of the organization but separate from client devices of the users 121 (e.g., on routers or other networking hardware of the organization 120), and in other embodiments is implemented as a non-executable data file on the client devices of the users 121.

In response to the delegation 215 and the corresponding receipt of the HTTP request, the remote login service 106 determines 220 whether the requesting user is already logged into the server 100, acting as the Identity Provider. In one embodiment, to accomplish this, the remote login service 106 determines 220 whether the received HTTP request has a corresponding token indicating a session with the server 100, e.g., by determining whether the HTTP request includes a cookie specifying a token for a session. Since the HTTP request of step 215 was delegated via the auto-login service 125 as part of a request for the domain of the third-party application 111 (e.g., www.myapp.com), no cookies or other information relevant to the domain of the server 100 were sent in the original HTTP request 205 from the user's browser 121. Therefore, the remote login service 106 determines that the received HTTP request 215 does not have a corresponding token indicating a session with the server.

Accordingly, the remote login service 106, part of the server 100, sends 225 the client device of the user 121 a redirect to the server 100, with the purpose of having the server 100 obtain the information about the client device of the user 121 and, if necessary, establishing a new session for the user 121. The sending 225 of the redirect includes an identifier of the requested third-party application 110 to track the original intent of the user 121. For example, the redirect might be to the URL http://login.server.com/login?app=myapp.com/login, where login.server.com is the domain name of the server 100, the path "/login" indicates that the server 100 should perform the login function to establish the session, and the parameter app=myapp.com/login indicates that the application to which the user 121 wishes to login is at URL myapp.com/login. The remote login component's sending 225 of the redirect, and the corresponding redirect 230 of the client device of the user 121 to the server 100, causes the server 100 to handle the login of the user 121 and determine if a session for the user 121 with the server 100 exists, or starts the process of establishing a new session if one is needed.

As part of the receipt of the request embodied by the URL of the redirect 230, the server 100 also receives the cookies corresponding to the server 100 (e.g., those of server.com), and accordingly determines whether the user 121 is currently logged into the server 100 itself, e.g., by determining whether the cookies indicate a current session for the user (for instance, whether there is an expected cookie with a valid session token).

If the user is determined not to be already logged in to the server 100, the server provides 235 the user 121 with a login user interface for logging into the server 100 and its remote login service 106, such as a user interface for providing a username and password (or other credentials, in some embodiments including multi-factor authentication (MFA) credentials) of the user on the server 100. In one embodiment, the login user interface also includes an indicator of the third-party application 110 to which access is being sought, such as in the user interface code for handling submission of the credentials. The user 121 then uses the provided login user interface to provide 240 the user's credentials for login to the server 100.

Assuming that the user 121 successfully logs in to the server 100 as a result of step 240, or already had a valid session in step 230, the server 100 generates 245 a token indicating that the user has established a session with the server and has been granted access to log into the given third-party application 110. The token may be generated in different manners in different embodiments. For example, in some embodiments a separate token is generated for the session of the user 121 with the server 100 and for the authorizations of the user 121 to access one of the third-party applications 110. In these embodiments, the server 100 creates a session token for the user 121 and an application token for each third-party application 110 with which the user 121 has (implicitly or explicitly) requested access via the server 100. Thus, if the user has logged into the server 100 and obtained access via the server 100 to N third-party applications 110, the server 100 will generate N+1 tokens: one for the user-server session, and one for authorization for each of the user-requested third-party applications 110. In other embodiments, the information about the user-application authorizations is included as part of the same token that stores the user-server session, either explicitly within the token itself, or implicitly with reference to the token. For example, in an implementation in which the user-application authorizations are stored explicitly, the token could contain a unique identifier of the user-server session, followed by a bit vector specifying whether, for each of the possible third-party applications 110, the user has permission to log into that third-party application via the server 100. In an implementation in which the user-application authorizations are stored implicitly, the server 100 could store indications of the various applications for which the user is authorized in a separate data store, such as a database, indexed by the session token. In either the explicit or the implicit implementations, the set of user-application authorizations can be determined all at once (e.g., when the user 121 logs on 240 to the server 100), or each user-application authorization can be separately determined at the time that the application 110 is requested by the user 121.

With the token generated 245, in one embodiment the server 100 causes the user's request to be handled by the remote login service 106, now that the appropriate token(s) have been generated by the server. In this embodiment, the server 100 sends a redirect 250 to the client device of the user 121. The URL of the redirect specifies the remote login service 106, and accordingly the client device of the user 121 redirects 255 to the remote login service (e.g., to a URL specific to the application login service, such as http://applogin.server.com), providing the context that is specific to the server 100 (e.g., cookies for the domain of the server 100) and that includes the token(s). The server 100 also indicates the third-party application 110 to which access is being sought, such as by including an identifier of the application as a parameter of the URL (e.g., http://applogin.server.com?app=myapp.com/login, where the value of the 'app' parameter specifies the third-party application).

The remote login service 106 receives the HTTP request corresponding to the redirect 255, including the context that contains the token(s). The remote login service 106 accordingly obtains the token (e.g., by reading the token from cookies received from the client device of the user 121) and verifies 260 that the token indicates that the user 121 has authorization to use the remote login service 106 to log in to the third-party application 110.

Assuming that the token was verified at step 260 to authorize the user 121 to log in to the third-party application 110 via the remote login service 106, the remote login service 106 communicates with the third-party application 110 and with the client device of the user 121 in steps 265-275 in order to log the user in to the third-party application and to provide the user with the data needed to successfully communicate with the third-party application 110 after the login.

For example, the remote login service 106 logs 265 the user 121 in to the third-party application 110. In one embodiment, the login is accomplished using a headless browser (a browser process without a corresponding graphical user interface with which the user 121 must interact) executing on the server 100. For example, in some embodiments the remote login service 106 looks up the third-party application 110 in the application login database 102 to determine the login format expected by the third-party application, looks up the user's login credentials (e.g., username/password) in the organization-user database 101, and provides those login credentials to the third-party application 110 in the expected format. The headless browser interacts directly with the third-party application 110 using HTTP commands (e.g., using an HTTP POST command), freeing the user 121 from the necessity of specifying the login credentials using a user interface, thereby allowing the login process to be transparent to the user. More generally, the role of the headless browser may be played by any process lacking a graphical user interface that communicates with the third-party application using HTTP.

As a result of the login performed by the remote login service 106 at step 265, the third-party application 110 redirects the remote login service to a URL for a start page of the third-party application and provides 270 the remote login service 106 with session data (e.g., session cookies) to store. The URL for the start page, and the session cookies, represent state of the user 121 in relation to the third-party application 110 following user login, and are the same as the third-party application would have provided had the user 121 logged in directly using the browser of the user's client device.

In some embodiments, in order to provide better user response time, the remote login service 106 performs steps 265-270 before the user 121 requests the use of, or login to, the application 110. For example, the remote login service 106 can read the application login database 102 to identify the third-party applications 110 that the user 121 is authorized by the organization 120 to access and accordingly proactively log in to all or a subset of those applications 110 (e.g., in response to a login by the user 121 to the server 100), caching the session data received at step 270 for each of the applications. Then, after step 260, the remote login service 106 proceeds directly to step 275, using the cached session data. In some embodiments, the remote login service 106 identifies a subset of the third-party applications 110 that the user 121 is authorized by the organization 120 to access based on the importance of the applications 110 to the user 121 and performs steps 265-270 in advance only for those applications. The importance of the applications 110 to the user 121 may be determined in different manners in different embodiments, such as by determining how frequently the user has accessed the various applications 110 during some past time period.

In order to allow the user 121 to begin interacting with the third-party application 110 (into which the user is now logged), the remote login service 106 sends 275, to the browser of the user's client device, a redirect to the URL for the start page, along with the session cookies received from the third-party application. Accordingly, the browser of the user 121 redirects 280 to the URL of the start page of the third-party application 110, passing the received session cookies. The receipt of the session cookies causes the third-party application 110 to acknowledge that the user 121 is already logged in to the third-party application and therefore to proceed to interact with the user.

Thus, the process of FIG. 2 allows the user 121 to be transparently logged in to a specified third-party application via the remote login service 106 of server 100, acting in conjunction with the auto-login component 125 that operates within the domain of the user's organization 120. The organization 120 need not install executable software on the individual client devices of the users 121 (or, if the auto-login component is implemented on networking devices of the organization 120, the organization need not install anything on the client devices at all), thereby greatly reducing the organizational overhead of supporting the transparent login.

It is appreciated that the actions of FIG. 2 could be done in different orders in different embodiments, or based on different assumptions. For example, the actions of FIG. 2 assume that the user 121 has not yet logged into the server 100. If the user had already logged into the server 100, the server 100 could present the user 121 with a user interface illustrating all of the third-party applications 110 that the user is authorized by the organization 120 to access, and the user could click on or otherwise designate one of the illustrated applications 110 in order to log on to and start using that application. Since the user 121 is already logged into the server, upon the user's designation of one of the applications 110, the actions of FIG. 2 would proceed from step 240 (if the server 100 generates individual tokens for each user-application pair) or step 255 (if the server 100 generates a token only for the session of the user with the server 100 and includes all the user-application authorization pairs implicitly or explicitly within the server session token).

Figure 3:
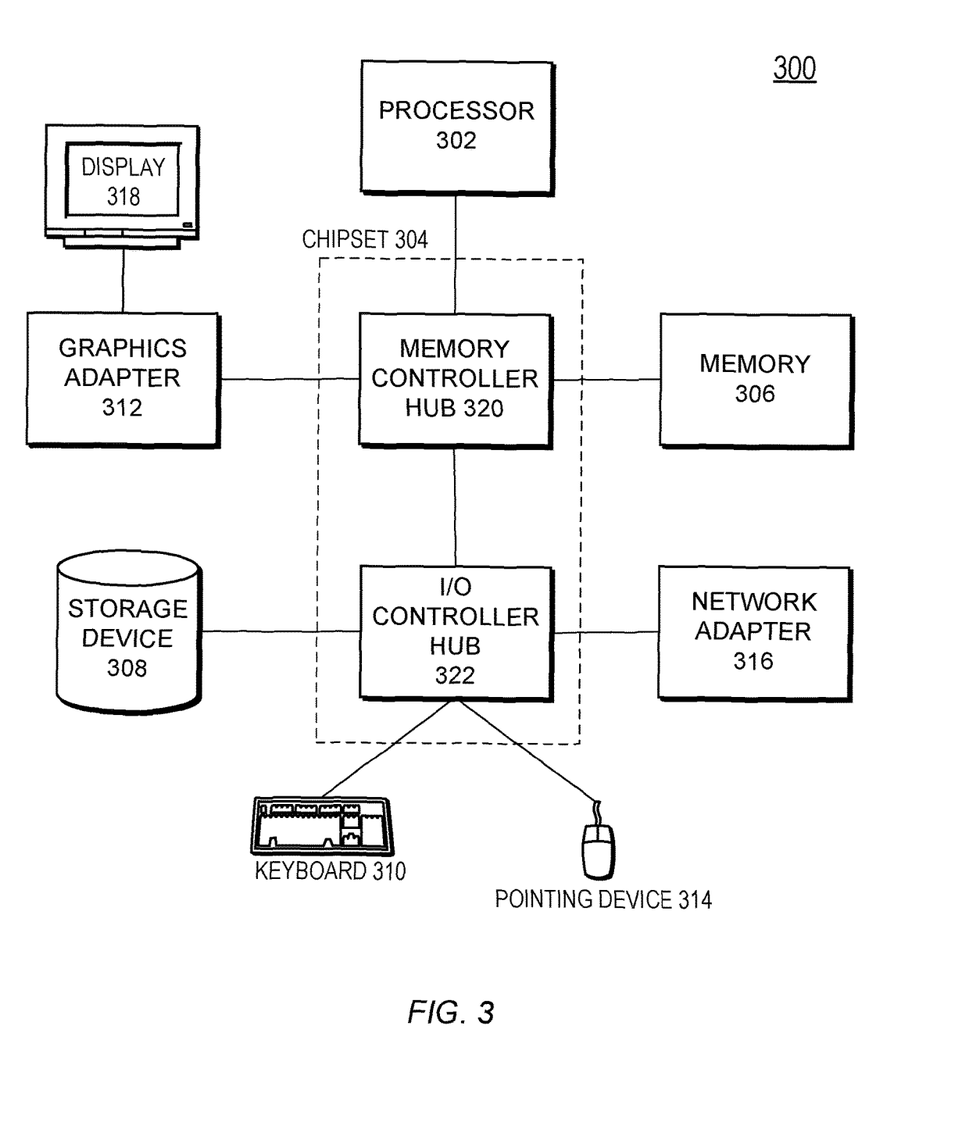
FIG. 3 is a high-level block diagram illustrating physical components of a computer used as part or all of the server, organization, client device of a user, or system providing the third-party application, according to one embodiment.

FIG. 3 is a high-level block diagram illustrating physical components of a computer 300 used as part or all of the server 100, organization 120, client device of a user 121, or system providing the third-party application 110, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method performed by an organization, the method comprising:
   intercepting, by an auto-login component of the organization, a request from a client device of the organization to access a remote third-party application;
   generating, by the auto-login component, a substitute request that specifies a remote login service and includes at least part of the intercepted request, wherein the at least part of the intercepted request comprises an identifier of the remote third-party application;
   sending, by the auto-login component, the substitute request to a remote login service at a remote server outside a network domain of the organization;
   receiving, from the remote login service, by a browser of the client device, a redirect request to the remote login service, the redirect request including the identifier of the remote third-party application;
   responsive to receiving the redirect request, redirecting, by the browser to the remote login service;
   receiving, from the remote login service, based on the identifier of the remote third-party application, a uniform resource locator (URL) of a start page of the remote third-party application and a session cookie generated by the remote third-party application and indicating that the client device is logged into the remote third-party application; and
   automatically requesting, by the browser, the start page of the remote third-party application, the request for the start page including the session cookie.

2. The computer-implemented method of claim 1, wherein the request to access the remote third-party application specifies a URL of the remote third-party application.

3. The computer-implemented method of claim 1, wherein the identifier of the remote third-party application is a parameter of a URL to which the browser is to be redirected.

4. The computer-implemented method of claim 1, wherein the auto-login component is implemented on a networking device of the organization.

5. The computer-implemented method of claim 1, wherein the auto-login component is implemented as a non-executable file on the client device.

6. A computer-implemented method performed by a login service, the method comprising:
   receiving, from an auto-login component of a remote organization, a request to log a user of the remote organization in to a remote third-party application;
   communicating with the remote third-party application via a headless browser to log the user in to the remote third-party application;
   receiving, from the remote third-party application, a uniform resource locator (URL) of a start page of the remote third-party application and a session cookie indicating that the user is logged into the remote third-party application; and
   providing, to a browser of the user, the session cookie and a redirect to the URL of the start page,
   wherein the login service performs the communicating and the receiving of the URL before the receiving of the request to log in.

7. The computer-implemented method of claim 6, further comprising:
   determining whether a token has been stored by the login service for a combination of the client device and the remote third-party application; and
   responsive to the token not having been stored by the login service, providing a redirect to the browser, the redirect causing transfer of the browser to a URL of the login service.

8. The computer-implemented method of claim 7, further comprising:
   generating and storing the token for the combination of the client device and the remote third-party application.

9. The computer-implemented method of claim 6, wherein the request specifies a URL of the remote third-party application.

10. The computer-implemented method of claim 6, wherein the headless browser sends HTTP requests to the remote third-party application without providing a user interface to the client device.

11. The computer-implemented method of claim 1, further comprising: determining an importance of the remote third-party application relative to the client device; and performing the communicating and the receiving of the URL before the receiving of the request to log in responsive to the determined degree of importance.

12. A non-transitory computer-readable storage medium storing computer program instructions executable by a computer processor, the instructions comprising:
   intercepting, by an auto-login component of an organization, a request from a client device of the organization to access a remote third-party application;
   generating, by the auto-login component, a substitute request that specifies a remote login service and includes at least part of the intercepted request, wherein the at least part of the intercepted request comprises an identifier of the remote third-party application;
   sending, by the auto-login component, the substitute request to a remote login service at the remote server;
   receiving, from the remote login service by a browser of the client device, a redirect request to the remote login service, the redirect request including the identifier of the remote third-party application;
   responsive to receiving the redirect request redirecting, by the browser to the remote login service;
   receiving, from the remote login service, based on the identifier of the remote third-party application, a uniform resource locator (URL) of a start page of the remote third-party application and a session cookie indicating that the client device is logged into the remote third-party application; and automatically requesting, by the browser, the start page of the remote third-party application, the request for the start page including the session cookie.

13. The non-transitory computer-readable storage medium of claim 12, wherein the request to access the remote third-party application specifies a URL of the remote third-party application.

14. The non-transitory computer-readable storage medium of claim 12, wherein the identifier of the remote third-party application is a parameter of a URL to which the browser is to be redirected.

15. The non-transitory computer-readable storage medium of claim 12, wherein the auto-login component is implemented on the networking device of the organization.

16. The non-transitory computer-readable storage medium of claim 12, wherein the auto-login component is implemented as a non-executable file on the client device.

* * * * *